United States Patent

[11] 3,631,779

| [72] | Inventors | Kunihiko Hori;<br>Keno Okuno, both of Kawasaki-shi, Japan |
| --- | --- | --- |
| [21] | Appl. No. | 833,590 |
| [22] | Filed | July 16, 1969 |
| [45] | Patented | Jan. 4, 1972 |
| [73] | Assignee | Nippon Rogaku K.K.<br>Tokyo, Japan |
| [32] | Priority | June 24, 1968 |
| [33] | | Japan |
| [31] | | 43/53474 |

[54] ELECTRONIC FLASH DEVICE FOR A CAMERA
1 Claim, 5 Drawing Figs.

| [52] | U.S. Cl. | 95/11.5 R |
| --- | --- | --- |
| [51] | Int. Cl. | G03b 9/70 |
| [50] | Field of Search | 95/11 R, 11 L, 11.5 R |

[56] References Cited
UNITED STATES PATENTS

| 1,973,937 | 9/1934 | Tracy | 95/11.5 |
| --- | --- | --- | --- |
| 2,899,880 | 8/1959 | Graef | 95/11.5 |
| 3,383,994 | 5/1968 | Bihlmaier | 95/11.5 |
| 3,424,071 | 1/1969 | Schwahn | 95/11.5 |

*Primary Examiner*—Samuel S. Matthews
*Assistant Examiner*—Fred L. Braun
*Attorney*—Harry G. Shapiro ABSTRACT: A lamp device for indicating the completion of the charge in an electronic flash lamp unit having a synchro circuit connectable to a synchro-contact circuit in a camera. The device consists of a cable for picking up a voltage applied to both poles of the flash tube, through terminals thereof which are provided at the side of the electronic flash lamp unit. The indicating lamp may be built into an indicating lamp adapter or the camera body, for example, the view finder. A voltage adjusting device is provided between the indicating lamp and the terminals in such a manner that the adjusting device is connected to at least one terminal of the synchro circuit of the flash unit.

PATENTED JAN 4 1972 3,631,779
FIG. 1
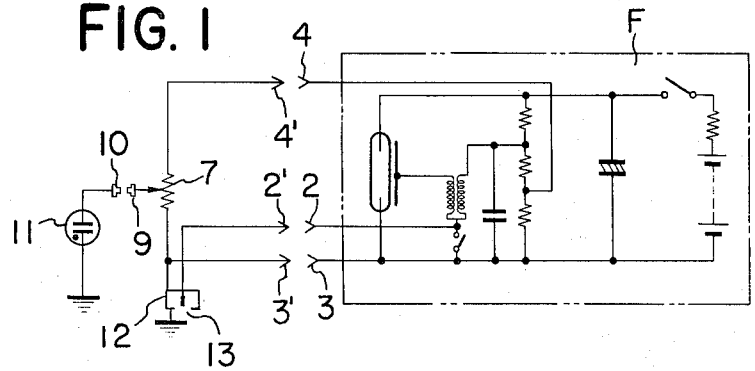
FIG. 2
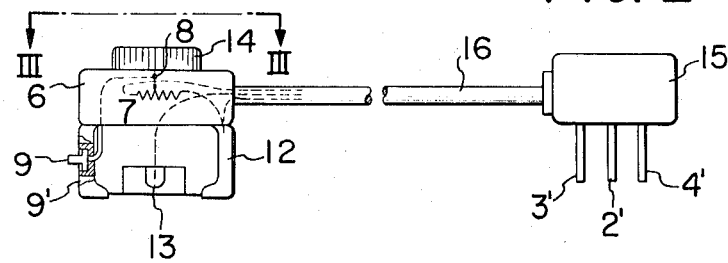
FIG. 4
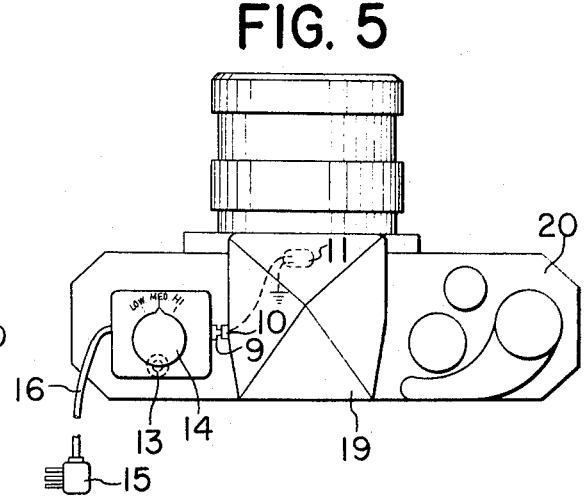
FIG. 5
FIG. 3
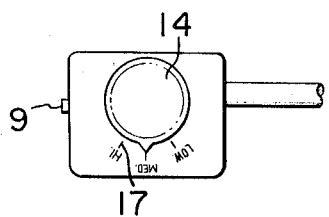
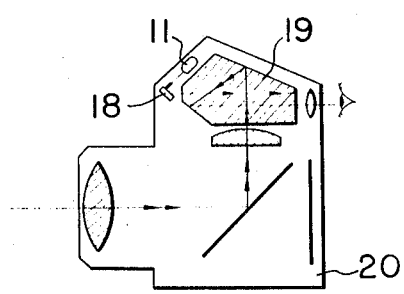
INVENTORS
KUNIHIKO HORI AND
KENO OKUNO
BY Harry G. Shapiro
ATTORNEY

ELECTRONIC FLASH DEVICE FOR A CAMERA

This invention relates to a lamp device for indicating the completion of charge in an electronic flash tube.

When the ready lamp indicative of charge completion of the electronic flash tube is installed in the view finder of the camera, the lamp is turned on by one of the following two ways:

1. The power is supplied from the synchro circuit of the electronic flash lamp.
2. The power is supplied through the terminals specially installed for the said lamp, independently of the synchro circuit.

However, method (1) in which the power is supplied from the synchro circuit has a drawback in that the voltage of the synchro circuit is dropped, which makes the electronic flash tube unable to flash, because the indicating lamp is connected to the synchro circuit in parallel. It is required, therefore, to increase in advance tee voltage applied to the synchro circuit by an amount to be dropped even when an indicating lamp is not used. This causes an unnecessarily high-discharge energy to be discharged through the synchro contact of the camera resulting in the acceleration of damage and in the reduction of the service life.

An object of this invention is to offer an indicating lamp device, in which the system employed has a separate terminal for the indicating lamp of (2) mentioned above and has no unfavorable influence on the synchro circuit as described above. The device includes a cable adapter which can be connected to the synchro socket of the camera simultaneously with the contact that is connected to the indicating lamp built in the viewfinder of the camera. Moreover, a voltage regulator is included so that when an electronic flash lamp that has a different operating voltage is used, the voltage can be regulated to a value that meets the rated voltage of the electronic flash lamp.

According to this invention an electronic flash ready lamp circuit can be used without having any influence on the voltage of synchro circuit and without causing a voltage drop in the synchro circuit. When the device is constructed as shown in the example described later, both the syncro circuit and the above-mentioned lamp circuit can be connected by only mounting the adapter to the accessory shoe of the camera. Moreover, electronic flash tubes of different power source voltage can be used by only switching the rotary knob of the voltage regulator. In short, this invention produces many practical advantages.

This invention will be described more clearing referring to the illustrative embodiment shown in the attached drawings, in which:

FIG. 1 is a circuit diagram of an embodiment of this invention and a circuit of electronic flash lamp that connects to this embodiment:

FIG. 2 shows an adapter as an embodiment of this invention, the cross section of a portion thereof being shown;

FIG. 3 is a plan view of FIG. 2 as seen along the line III—III;

FIG. 4 is a vertical cross-sectional view of a camera with built in ready lamp that uses the adapter of this invention mounted on it; and FIG. 5 is a plan view of the camera fitted with the above-mentioned adapter.

FIG. 1 shows a circuit for an adapter which is an embodiment of this invention and has terminals for an indicating lamp to be connected to the adapter. In FIG. 1, F is the circuit of the electronic flash lamp where 2 is the one end of the synchro terminal, 3 is a terminal which serves both the other end of the synchro terminal and one end of above-mentioned electronic flash lamp, and 4 is a terminal for the flash lamp; 2′, 3′ and 4′ are the terminals on the adapter side which are to be connected to terminals 2, 3, and 4 respectively; 7 is a variable resistor which adjusts the voltage for the indicating or signal lamp 11 when a speed light of different source voltage is used, where 8 is a contactor, 9 is a terminal to be used to connect the resistor 7 to the contact 10 for the lamp built in the above-mentioned viewfinder; 12 is a fitting for mounting the adapter to the shoe of the camera; 13 is a direct contact of the adapter.

In FIG. 2; 6 is a housing of the adapter according to this invention which has the built-in voltage adjusting resistor 7 and the shoe fitting 12 on the front surface and used to fit the housing to the camera. A rotary knob 14 used to adjust the said voltage adjusting resistor is fitted on the rear surface. On one side of the shoe fitting 12 is installed a contact 9 which is insulated from the shoe fitting 12 by an insulator 9′ as shown in the partial cross-sectional view. This contact 9 is connected to the contactor 8; 16 is a cord connecting the speed light to the adapter.

FIG. 3 is a plan view of a portion of the adapter excluding the cord and plug. The markings 17 are arranged properly corresponding to the source voltage of each electronic flash lamp. The rotary knob 14 can be set to any of these markings.

FIG. 4 shows an example of the light path of the indicating lamp 11 in a camera 20 with a finder having the built-in lamp 11 and which uses the adapter of this invention fitted to the camera 20. The light from the lamp 11 reaches an eye after being reflected by a reflecting mirror 18 and after passing through a pentaprism 19. FIG. 5 shows the adapter mounted on the camera 20.

With such a construction, when the adapter is mounted to the accessory shoe of the camera and when the plug 15 is connected to the electronic lamp or speed light, the direct contact 13 of the adapter is brought into contact with the direct contact on the camera side and is at the same time grounded to the body through the shoe fitting 12. Simultaneously, the contact 9 for the indicating lamp makes contact with the contact 10. Therefore, the indicating lamp 11 in the viewfinder of the camera goes on when the charging of the main capacitor of the electronic flash lamp has been completed and indicates that the electronic flash tube is ready for flashing. This enables a camera man to see that the electronic flash lamp has been completely charged without moving his eye from the viewfinder. Moreover, since the above-mentioned lamp is off during the period of several seconds between the time the electronic flash lamp is flashed by the operation of the camera shutter and the time the main capacitor of the electronic flash lamp has been completely recharged, the camera man can make sure that the electronic flash lamp was flashed. When using an electronic flash lamp of different source voltage, the voltage adjusting resistor can be adjusted by the rotary knob to obtain a proper operating voltage. Although in this example the indicating lamp is built in the finder of the camera, it is of course possible to use an indicating lamp adapter which has a built-in indicating lamp. It is believed that the advantages and improved results furnished by the device of the invention will be apparent from the foregoing detailed description of a preferred embodiment of the device. It will be apparent that various changes and modifications may be made without departing from the spirit and scope of the invention as sought to be defined by the claim.

What is claimed is:

1. An electronic flash device for a photographic camera comprising an electronic circuit in a flash lamp unit including a gaseous flash lamp, a main capacitor and electrical components for triggering said flash lamp, signal lamp means visibly situated within the camera for indicating that said flash lamp unit is ready for operation when the signal lamp means is illuminated; a flash synchronizing contact on the camera, a signal contact on the camera connected to said signal lamp means, a synchronizing cable for electrically connecting said synchronizing contact of the camera and said signal contact to said electronic circuit, a first plug unit being provided at one end of said synchronizing cable and having first contact means directly connectable to said synchronizing contact and second contact means directly connectable to said signal contact, said first contact means being connected to said triggering component in said flash lamp unit through two wires and said second contact means being connected to the positive side of said capacitor through a third wire, a second plug unit being provided at the other end of said synchronizing cable and having three contacts connectable to said three wires, said flash lamp unit having a plug socket for receiving said second plug unit, and said first plug unit further including means for mounting said first plug unit on an accessory shoe of the camera and a manually operable variable resistor for adjusting the voltage applied to said signal lamp means.

* * * * *